J. CUMMINS.
STUMP-EXTRACTOR.
No. 177,810.                    Patented May 23, 1876.
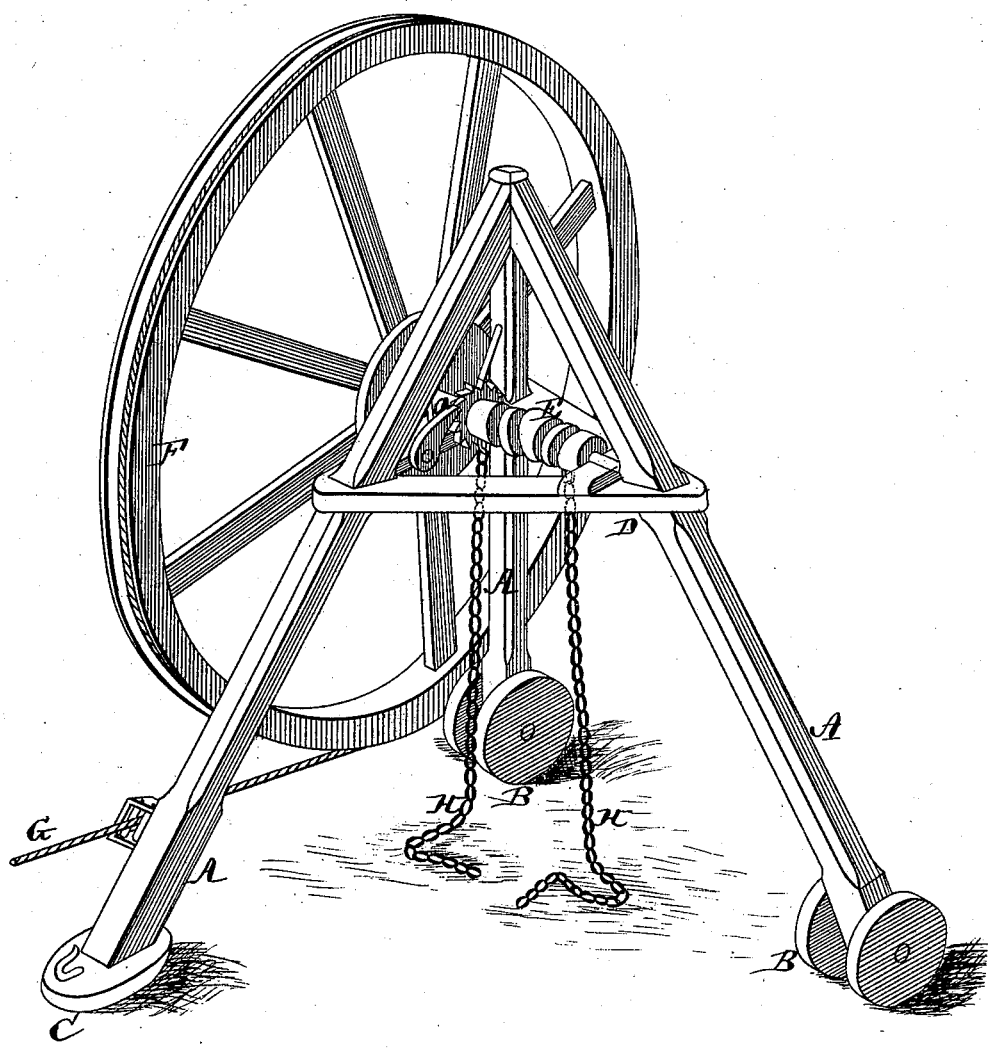
WITNESSES
Henry N. Miller
C. L. Evert.
INVENTOR
John Cummins.
Alexander Mason
Attorneys

UNITED STATES PATENT OFFICE.

JOHN CUMMINS, OF ALLEGAN, MICHIGAN.

IMPROVEMENT IN STUMP-EXTRACTORS.

Specification forming part of Letters Patent No. 177,810, dated May 23, 1876; application filed November 18, 1875.

*To all whom it may concern:*

Be it known that I, JOHN CUMMINS, of Allegan, in the county of Allegan, and in the State of Michigan, have invented certain new and useful Improvements in Stump-Extractors; and do hereby declare that the following is a full, clear, and exact description thereof, reference being had to the accompanying drawings, and to the letters of reference marked thereon, making a part of this specification.

The nature of my invention consists in the peculiar construction and arrangement of a frame and its mountings with a windlass and wheel, for extracting stumps, the peculiarities of which will be hereinafter more fully set forth.

In the annexed drawing, which is a perspective of my machine, A A A represent frame-pieces, the lower ends of which are placed at a suitable distance apart and equidistant. The upper ends of these pieces meet, and are securely bolted or fastened together, and form a tripod-frame. D D are frame-pieces, which lie in a horizontal position, and serve to bind and secure the uprights A A firmly together, as well as to answer as bearings for the shaft E. Two of the uprights A are provided at their lower ends with caster-wheels B B, and one of said uprights with a pivoted shoe, C. This shoe C is provided with a hook or clevis, to which power is attached when the machine is to be moved.

The shoe, working upon a pivot, of course turns with the direction of the power moving the machine, and the caster-wheels follow.

E represents a shaft, which has its bearings in the frame-pieces D. This shaft lies in a horizontal position, and is provided on its outer end with a wheel, F. This wheel is made of any suitable diameter, but large enough to afford a good leverage, and has its periphery grooved, so that it will retain a cord or chain, which is carried around it for the purpose of operating it.

The shaft may be serrated or grooved, to retain in place a chain, H, which is connected to it. The shaft is provided with a ratchet-wheel, and the frame with a pawl, as seen at *a*. In using this machine the chain H is secured to the stump. The cord G is then passed around the wheel F, and, power being applied to it, the stump or root is extracted by the chain as it winds around the shaft E. The wheel F is made dishing in form, so that it will work closely in by the side of and between two of the uprights A A.

Having thus fully described my invention, what I claim as new, and desire to secure by Letters Patent, is—

The frame composed of the uprights A A and the pieces D D, in combination with the shaft E, wheel F, and cords and chain described, as and for the purposes set forth.

In testimony that I claim the foregoing I have hereunto set my hand this 25th day of October, 1875.

JOHN CUMMINS.

Witnesses:
JOHN M. HEATH,
EZRA BABBITT.